June 28, 1927.

H. E. SLOAN

CHUCK

Filed May 5, 1922

1,633,828

INVENTOR
Harry E. Sloan,
by
Arthur B. Jenkins,
ATTORNEY

Patented June 28, 1927.

1,633,828

UNITED STATES PATENT OFFICE.

HARRY E. SLOAN, OF HARTFORD, CONNECTICUT, ASSIGNOR TO THE CUSHMAN CHUCK COMPANY, OF HARTFORD, CONNECTICUT, A CORPORATION OF CONNECTICUT.

CHUCK.

Application filed May 5, 1922. Serial No. 558,560.

My invention relates more especially to that class of chucks embodying jaws radially movable on its face, and an object of my invention, among others, is to provide a device of this class having means for supporting the feed screws in a particularly efficient manner.

A form of chuck embodying my invention and in the construction and use of which the objects herein set out, as well as others, may be attained, is illustrated in the accompanying drawings, in which—

Figure 1:
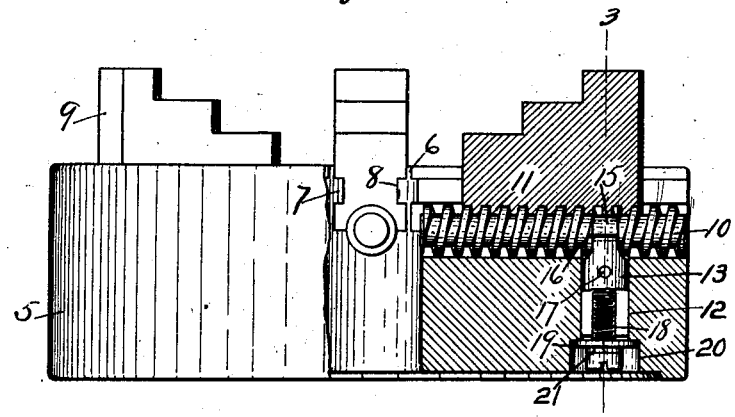
Figure 1 is a view in side elevation of a chuck embodying my invention with one side broken away in central section to illustrate construction.
Figure 2:
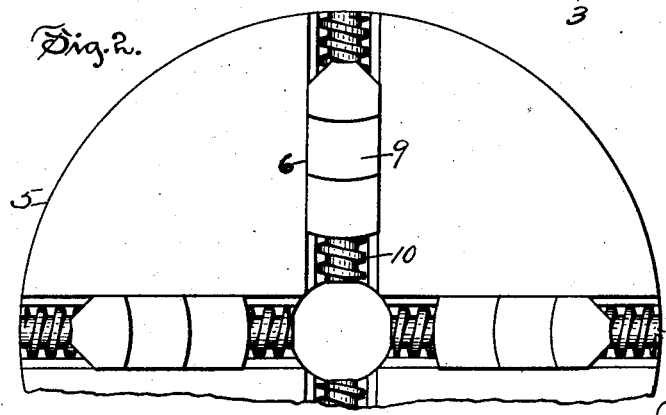
Figure 2 is a face view of a portion of the chuck illustrated in Figure 1.
Figure 3:
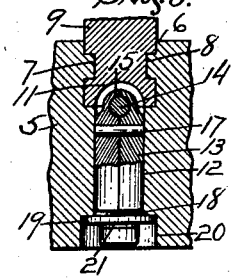
Figure 3 is a detail view in section through a fragment of the chuck showing the feed screw support partially cut away, and in section on plane 3—3 of Figure 1.

It is of material advantage in chucks of the type illustrated herein that means be provided for readily inserting the feed screw and the support therefor, and without removing parts of the chuck, and in my improved device I have provided such means, having so constructed the feed screw support that it may be inserted into the chuck jaw grooves from the face of the chuck, as to one form of the device, the support acting to retain the feed screw in position, and said screw acting to retain the support in place, such structure being shown in the drawings herein in which the numeral 5 denotes the body of a chuck having slots 6 radially arranged therein with guides 7 in the form of ribs on the side walls of the groove, which guides are received within guide grooves 8 in opposite sides of chuck jaws 9. Feed screws 10 are rotatably mounted in the chuck body 5 appurtenant to each of the jaws, the threads of the screws meshing with racks 11 on the bottoms of the jaws 9. The parts thus far described are of old and well known construction, in which the feed screws may or may not be connected for simultaneous operation, such connection when employed being well understood by those skilled in the art.

Prior to my invention various means have been employed for supporting the feed screws 10 and my invention has to do with the means for supporting them in a manner to obtain advantages not present in previous structures.

To this end I form holes 12 preferably extending through the chuck body from the slots 6 and of a size to receive retaining screw supports 13. These supports are formed to quite closely fit the holes 12 but in a manner to permit their removal without undue force. The supports are preferably round in cross section as to the body portions thereof, and each is divided on a plane passing centrally longitudinally through it. Each member of each support has a portion of a bearing at its outer end, said bearing comprising straps 15 extending from each support and preferably meeting at their ends, a bearing being thus formed for a feed screw 10. Each feed screw is provided with an annular groove 16 located between its ends, preferably near the center, said groove being provided by reducing the size of the feed screw as at 14. Pins 17 may be employed, if desired, to prevent relative movement of the two members of each screw support. In assembling the device the two members of a screw support are placed together to inclose a feed screw between them, the annular groove in the feed screw receiving the straps 15 that closely fit within the groove to provide a bearing for said screw. Said screw and support are then inserted from the face of the chuck body through a groove 6, the body of the support being entered into a hole 12. A jaw 9 is now inserted at the end of its groove and engaged with the threads on the feed screw that may be turned in any suitable manner, a socket in the end of the screw to receive a wrench being commonly employed (to move the jaw to place). The straps encircling the bearing portion of the screw retain the support in place and the members of the support are held together by the walls of the hole in which the support is located, this to retain the strap in engagement with the bearing portion of the screw by reason of the fit of the body portion of the support 13 in its hole 12. It will thus be seen that the screw and the support mutually act to retain each other in place, the support retaining the screw against longitudinal movement and the screw preventing displacement of the support.

In order to prevent unintentional rotation of the feed screw 10 and a consequent loosening of the jaws 9, I provide means for placing a spring tension upon the feed screws, such means, in the specific form of the invention illustrated herein, embodying a tension screw 18 fitting a screw threaded hole in the support 13, such threaded hole being formed in the parts of the members comprising the support. A tensioning washer 19 is seated against the bottom of a counterbore 20 at the mouth of the hole 12 to support the tension screw 18, a tensioning member, as shown herein in the form of a spring washer 21 being placed under the head of the screw 18 and between the under side of said head and the washer 19.

The support 13 is, therefore, made use of as a means for placing tension upon the feed screw, such support serving a very useful function in this connection.

The invention above described is illustrated as embodied in an independent chuck, that is, a chuck in which each of the jaws are independently movable.

Figure 4:
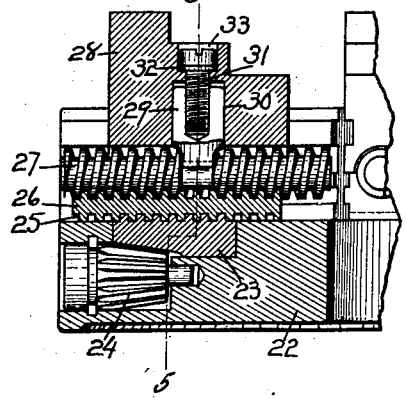
Figure 4 is a detail view in section through a fragment of the chuck illustrating another arrangement of the feed screw support.
Figure 5:
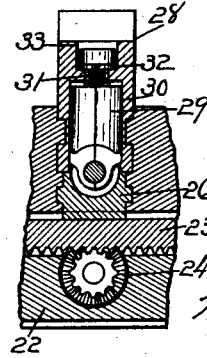
Figure 5 is a view in section through a fragment of the chuck on a plane denoted by the dotted line 5—5 of Figure 4.

In that form of the device shown in Figures 4 and 5 another adaptation of the screw support is illustrated, this in connection with what is known as a "universal chuck", that is, a chuck in which all of the jaws may be simultaneously moved in their slots. In this structure the chuck body 22 is provided with the usual feed scroll 23 operated as by means of a feed pinion 24, all constructed in any ordinary and well known manner. The feed scroll meshes with a rack 25 on the under surface of a jaw carrier 26, a screw rack on the upper surface of said carrier receiving the threads of a feed screw 27 mounted in the chuck body and in engagement with the segments of screw threads on the under side of chuck jaws 28, all of which parts are of old and well known construction.

In adapting my invention to this form of chuck the support 29 is inserted into a hole 30 in the bottom of each of the chuck jaws, the straps of the support encircling the feed screw as in the structure first hereinbefore described.

A tension screw 31 is inserted into the support from the top of the jaws, the head of the screw being seated upon a tensioning member in the form of a spring washer 32 in the bottom of a counterbore 33 at the mouth of the hole in which the screw is located, said hole communicating with the hole 30 for the support.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:—

1. A chuck comprising a body and a chuck jaw slidably mounted thereon, one of said members having a hole therethrough including a counterbored portion, a feed screw support comprising two members engaging a feed screw from opposite sides to afford a support therefor, said members fitting said hole whereby they are held together, a retaining screw fitting a threaded opening in said support, a tensioning device located underneath the head of said screw to exert pressure thereagainst that is resisted by the bottom of said counterbored part, and a jaw feeding screw engaged by said support and held thereby.

2. A chuck comprising a body, a feed screw for a jaw located on the body, a chuck jaw slidably mounted on the body in engagement with said feed screw, a feed screw support comprising two members engaging said feed screw from opposite sides to afford a support therefor, said members fitting a hole in said body whereby they are held together, a retaining screw engaged with said support, and a tensioning device located underneath the head of said screw to exert pressure thereagainst that is resisted by the bottom of a counterbored hole in said body.

HARRY E. SLOAN.